(12) United States Patent
Wood

(10) Patent No.: US 6,973,774 B1
(45) Date of Patent: Dec. 13, 2005

(54) HYBRID PROPULSION SYSTEM

(76) Inventor: Robert V. S. Wood, 361A Fairmount Rd., Califon, NJ (US) 07830

( * ) Notice: Subject to any disclaimer, the term of this patent is extended or adjusted under 35 U.S.C. 154(b) by 22 days.

(21) Appl. No.: 10/876,355

(22) Filed: Jun. 25, 2004

(51) Int. Cl.⁷ ............................................. F02K 11/00
(52) U.S. Cl. .................... 60/257; 60/269; 60/39.23; 239/265.19
(58) Field of Search .................... 60/204, 205, 257, 60/269, 767, 794, 39.23, 39.461; 239/265.19

(56) References Cited

U.S. PATENT DOCUMENTS

| | | | | |
|---|---|---|---|---|
| 3,110,153 A | * | 11/1963 | House | 60/207 |
| 3,237,400 A | * | 3/1966 | Kuhrt | 60/246 |
| 5,025,623 A | * | 6/1991 | Hirakoso et al. | 60/257 |
| 6,202,404 B1 | * | 3/2001 | Balepin | 60/204 |
| 6,619,031 B1 | * | 9/2003 | Balepin | 60/246 |
| 6,644,015 B2 | * | 11/2003 | McKinney | 60/205 |

* cited by examiner

Primary Examiner—Ehud Gartenberg

(57) ABSTRACT

While commercial jet aircraft are capable of transporting large pay load economically, the same is not true for rockets. To solve this problem, a hybrid propulsion system is proposed for use in Horizontal Take-Off and Land (HOTOL) craft. The purpose is to maximized the use of ambient oxygen and minimize the use of cryogenic oxygen. At the core of the system is a jet engine whose after burner is modified to act as an evaporator. Liquid oxygen is pumped in, vaporized and ducted forward to the air intake through a gate. The gate is designed to control the mix of ambient oxygen and cryogenic oxygen going into the engine. It is also used as a hear shield to protect the engine from reentry temperatures.

1 Claim, 1 Drawing Sheet

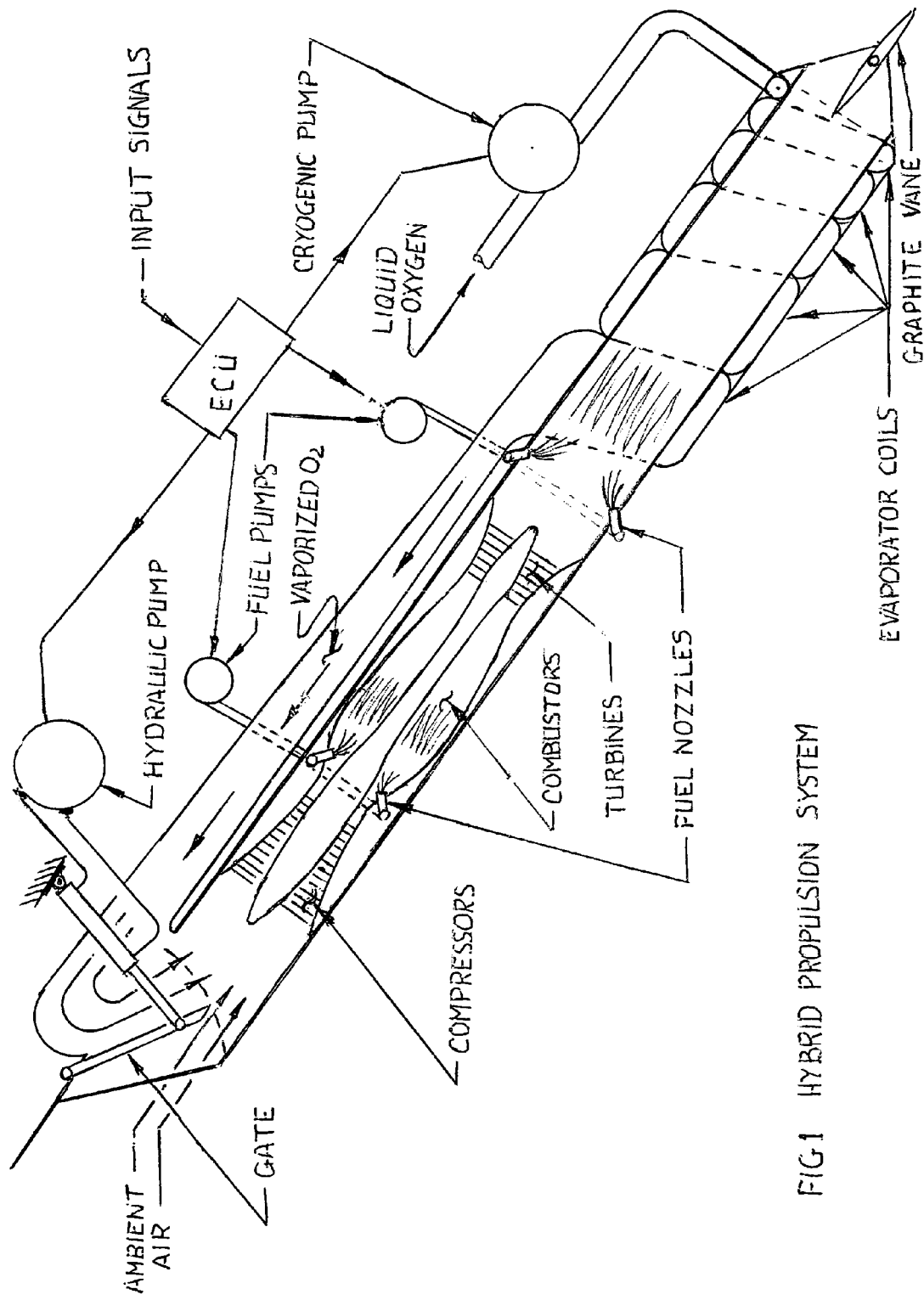
FIG 1 HYBRID PROPULSION SYSTEM

HYBRID PROPULSION SYSTEM

FEDERAL SPONSORSHIP

None

BACKGROUND OF THE INVENTION

This invention pertains to the field of aerospace propulsion systems. Presently, the altitude to which an aircraft can ascend is limited by the lack of oxygen in the atmosphere. This invention is intended to solve the particular problem.

SUMMARY OF THE INVENTION

The object of this invention is to enable an air breathing engine to perform at much higher altitudes that are currently unattainable. This is achieved by augmenting the oxygen with an "on board" supply of cryogenic oxygen.

DESCRIPTION OF THE DRAWING

FIG. 1 is a general arrangement which shows a generic jet engine at the core of the system. The drawing illustrates the modified after burner section, now modified to vaporize liquid oxygen, which in turn is used as a coolant for the after burner sheet metal. At the opposite end, the gate is shown, deflecting the vaporized oxygen into the intake. Also shown, are the elements of a control system which link the gate aperture to the motor driving the cryogenic pump.

DESCRIPTION OF THE INVENTION

At the start the system, liquid oxygen is pumped into the evaporator which consists of a helical coil wrapped around the cylindrical after burner. The cross-section of the coil expands progressively to accommodate the expanding oxygen. The evaporator coils stop at the turbine section where it becomes a straight duct on the topside of the engine. The vaporized oxygen now passes through an opening in the top of the rectangular intake and is deflected towards the compressor section of the engine. With the gate setting illustrated in FIG. 1, ambient air is also admitted. The air/oxygen mix passes through the compressors into the combustors where fuel is sprayed in to maintain the flame front. The oxygen rich exhaust stream then enters the after burner where more fuel is added to further increase thrust. As altitude increases the gate gradually closes off the air intake, and the system continues to run on pure oxygen. Beyond the atmosphere, the exhaust stream is vectored for steering purposes.

What I claim as my invention is:

1. A hybridized rocket and jet engine apparatus operating in the atmosphere and in the outer space comprising:
    a housing;
    a fuel tank and at least two fuel pumps providing a fuelling rate;
    a liquid oxygen tank and a cryogenic pump;
    said housing comprising:
    a gas turbine engine serially comprising: an intake, a compressor, a combustor, a turbine, an afterburner, and an outlet;
    said afterburner comprising a heat exchanger wherein liquid oxygen is vaporized by indirect heat exchange with hot gases flowing in said afterburner;
    said vaporized oxygen injected between said intake and said compressor;
    said outlet comprising at least one graphite steering vane;
    said intake comprising a gate regulating the air/oxygen ratio during atmospheric operation;
    wherein during operation in space and during atmospheric re-entry said gate closes said intake;
    and wherein a control system links said intake aperture as defined by a position of said gate, said cryogenic pump rate, and said engine fuelling rate.

* * * * *